United States Patent
Winkler et al.

(10) Patent No.: US 7,761,235 B2
(45) Date of Patent: Jul. 20, 2010

(54) DEVICE FOR DETERMINING A MAXIMUM LATERAL SEPARATION OF A FOLLOWER CRAFT WITH RESPECT TO A LEAD CRAFT

(75) Inventors: Falk Winkler, Cintegabelle (FR); Guillaume Fouet, Toulouse (FR); Didier Menras, Toulouse (FR)

(73) Assignee: Airbus France, Toulouse (FR)

( * ) Notice: Subject to any disclaimer, the term of this patent is extended or adjusted under 35 U.S.C. 154(b) by 695 days.

(21) Appl. No.: 11/677,745

(22) Filed: Feb. 22, 2007

(65) Prior Publication Data

US 2007/0203649 A1 Aug. 30, 2007

(30) Foreign Application Priority Data

Feb. 28, 2006 (FR) .................................. 06 01714

(51) Int. Cl.
*G08G 1/16* (2006.01)
(52) U.S. Cl. ........................................ 701/301; 342/29
(58) Field of Classification Search ......... 701/300–302; 342/29, 41; 340/901, 903, 945, 961
See application file for complete search history.

(56) References Cited

U.S. PATENT DOCUMENTS

| | | | |
|---|---|---|---|
| 3,573,818 A | | 4/1971 | Lennon, Jr. et al. |
| 4,446,624 A | * | 5/1984 | Nowell et al. ................. 33/1 C |
| 4,674,710 A | | 6/1987 | Rodriguez |
| 5,506,587 A | * | 4/1996 | Lans ...................... 342/357.09 |
| 6,405,124 B1 | | 6/2002 | Hutton |
| 6,963,795 B2 | * | 11/2005 | Haissig et al. ................. 701/7 |
| 2005/0165516 A1 | | 7/2005 | Haissig et al. | |

FOREIGN PATENT DOCUMENTS

FR 2015709 4/1970

OTHER PUBLICATIONS

Preliminary Search Report dated Oct. 26, 2006 with English translation.

* cited by examiner

*Primary Examiner*—Yonel Beaulieu
(74) *Attorney, Agent, or Firm*—Dickinson Wright PLLC

(57) ABSTRACT

A device for determining a maximum lateral separation of a follower craft with respect to a lead craft. The device includes a first unit for deducing automatically from minimum turning radii of a lead craft and from a maximum turning radius of a follower craft, the maximum possible lateral separation of the follower craft with respect to the lead craft, on each side of the trajectory of the latter.

13 Claims, 2 Drawing Sheets

DEVICE FOR DETERMINING A MAXIMUM LATERAL SEPARATION OF A FOLLOWER CRAFT WITH RESPECT TO A LEAD CRAFT

TECHNICAL FIELD OF THE INVENTION

The present invention relates to a device for determining at least one maximum lateral separation of a follower craft, especially of a follower aircraft, with respect to a lead craft, especially a lead airplane.

BACKGROUND OF THE INVENTION

Although not exclusively, the present invention applies more especially to a patrol of aircraft. It is known that a patrol of aircraft, for example of fighters or military transporters, is composed of a lead aircraft, also called the leader, which is followed in flight according to a particular spacing (defined vertically, longitudinally and laterally) by one or more follower aircraft, also called wingmen. The relative flight between the lead aircraft and a follower aircraft may be performed:
  a) either simply (and exclusively) on the basis of the judgment of the pilot of the follower aircraft, as a function of his direct vision of the lead aircraft;
  b) or by way of a system of information and/or for aiding the pilot, such as an electronic system for aiding patrol flight.

During a patrol flight, the aircraft follow one another while attempting, in particular, to constantly maintain one and the same longitudinal separation and one and the same lateral separation.

In situation b) above, these longitudinal and lateral separations are generally input by the pilot of the follower aircraft into the electronic system for aiding patrol flight. The values input are usually based on the experience of the pilot and on the customary procedures relating to a patrol flight.

However, such an implementation may engender certain problems. In particular:
  if the pilot of the follower aircraft inputs a value of lateral separation that is too big, and if the lead aircraft performs a turn at high turning rate (on the side of the position of the follower aircraft), there is a risk that the follower aircraft may not be able to reduce its speed sufficiently to hold its relative position (taking into account said lateral separation value);
  conversely, if the lead aircraft performs a turn on the opposite side with a high turning rate, there is a risk that the follower aircraft may not be able to accelerate sufficiently and hence hold its relative position.

SUMMARY OF THE INVENTION

The object of the present invention is to remedy these drawbacks. It relates to a device for automatically determining at least one maximum lateral separation of a follower craft (especially of a follower aircraft) with respect to a lead craft (especially a lead aircraft).

For this purpose, said device is noteworthy according to the invention in that it is mounted on said follower craft and comprises:
  first means for devising information relating to the trajectory of said lead craft;
  second means allowing an operator to input a duration of movement;
  third means for determining automatically, with the aid of said information relating to said trajectory and of said duration of movement, minimum turning radii, left and right, for a craft which follows said trajectory for said duration of movement;
  fourth means for devising performance information relating to said follower craft;
  fifth means for determining automatically, at least with the aid of said performance information, a maximum turning radius of the follower aircraft; and
  sixth means for deducing automatically, from said minimum turning radii and from said maximum turning radius, the maximum possible lateral separation of the follower craft with respect to the lead craft, on each side of the trajectory of the latter.

Thus, the device in accordance with the invention makes it possible to determine automatically for the follower craft, on which it is mounted, a maximum lateral separation on each side of the trajectory of the lead craft, thereby making it possible to remedy the aforesaid drawbacks. In particular, the device in accordance with the invention makes it possible to prevent the occurrence of the aforesaid risks and, moreover, it makes it possible to reduce the workload of the pilot of the follower craft. As indicated previously, the present invention applies more especially, although not exclusively, to lead and follower aircraft forming part of a patrol of aircraft.

Advantageously, said first means comprise:
  a man/machine interface means allowing an operator to input into said device said information relating to the trajectory of the lead craft; and/or
  a data reception element which is formed in such a way as to receive said information relating to the trajectory of the lead craft.

Furthermore, advantageously, said fourth means comprise:
  a man/machine interface means allowing an operator to input said performance information into said device; and/or
  a database containing said performance information.

Additionally, in a particular embodiment, the device in accordance with the invention moreover comprises seventh means for determining variations in altitude of the follower craft, and said fifth means are formed in such a way as to take into account these variations in altitude to determine said maximum turning radius.

Furthermore, advantageously, said sixth means are formed in such a way as to carry out a smoothing of said maximum lateral separation at the level of the switch between two directly successive durations of movement.

Additionally, in a particular embodiment, the device in accordance with the invention moreover comprises:
  display means making it possible to present, on at least one viewing screen, an indicator of value illustrating said maximum lateral separation deduced by said sixth means. This makes it possible in particular to inform the pilot of the follower craft of the value of said maximum lateral separation. Said pilot consequently knows the maximum limit not to be exceeded when he determines a lateral separation, for example with the aim of inputting it manually into a standard system for aiding patrol flight; and/or
  a data sending element which is formed in such a way as to send said maximum lateral separation deduced by said sixth means. The maximum lateral separation sent by this data sending element may in particular be detected on board the lead craft. This makes it possible to implement a particular embodiment in which it is the lead craft which modifies its flight trajectory to take account of the lateral separations of the one or more follower craft, and not the converse.

Additionally, in a particular embodiment, the device in accordance with the invention moreover comprises:

- eighth means for devising auxiliary information relating to a patrol formed of said lead craft, of said follower craft and of at least one additional follower craft; and
- ninth means for determining, with the aid of said maximum lateral separation deduced by said sixth means and of said auxiliary information devised by said eighth means, a recommended relative position of said follower craft with respect to said lead craft.

In this case, preferably, said ninth means are formed in such a way as to carry out a tailoring of said recommended relative position by integrating said duration of movement.

Additionally, in a particular embodiment, the device in accordance with the invention moreover comprises a guidance system for guiding the follower craft, and this guidance system is formed in such a way as to guide said follower craft so that it is brought to and maintained at said recommended relative position.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
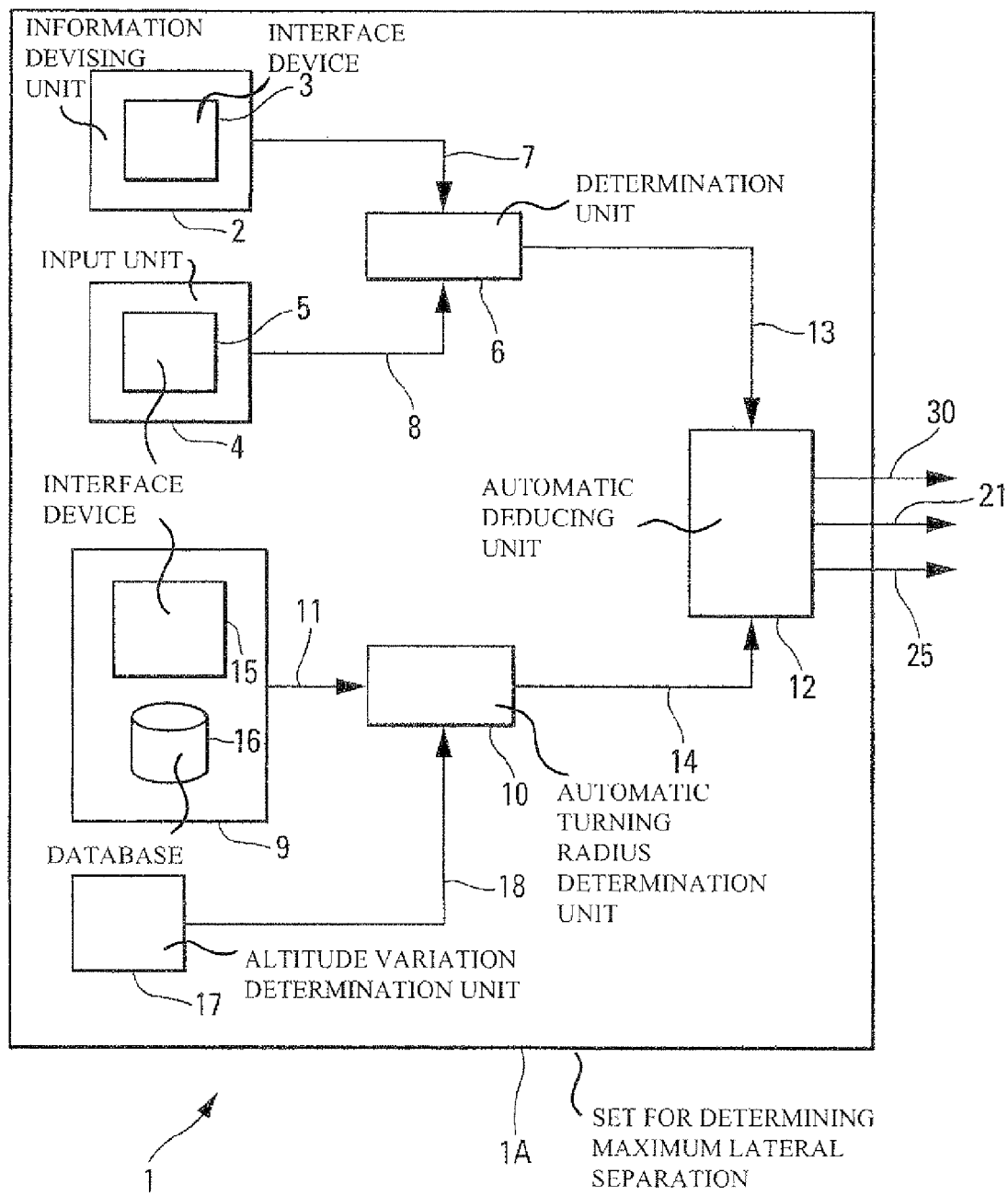
FIG. 1 is the schematic diagram of a device in accordance with the invention.

The device 1 in accordance with the invention and represented diagrammatically in FIG. 1 is intended at least to determine a maximum lateral separation of a follower craft with respect to a lead craft. Although this device 1 may be applied to various types of craft, and especially to ships, the following description refers exclusively (by way of preferred application) to aircraft, for example transport planes or helicopters.

These aircraft (not represented) are considered to form part of a patrol of aircraft comprising a lead aircraft (or leader) and at least one follower aircraft (or wingman). The device 1 in accordance with the invention is therefore mounted on the follower aircraft and is intended at least to determine a maximum lateral separation of this follower aircraft with respect to the lead aircraft.

To do this, said device 1 comprises at least one set 1A represented in FIG. 1 and comprising:

- means 2 for devising information relating to the flight trajectory TV of the lead aircraft. Although not exclusively, this information relates preferably to the flight plan of the lead aircraft. In the embodiment represented in FIG. 1, said means 2 comprise a man/machine interface means 3 which allows an operator, especially the pilot of the follower aircraft, to input the aforesaid information into the device 1;
- means 4 which allow an operator, especially the pilot of the follower aircraft, to input into the device 1 a duration of movement, in this instance a flight duration. This flight duration corresponds to the flight time which must be taken into account by the device 1 in accordance with the invention, in the manner specified hereinbelow. Preferably, said means 4 comprise a man/machine interface means 5 which is, for example, similar to the interface means 3 (or which corresponds to this interface means 3 in a simplified embodiment);
- means 6 which are connected, respectively by way of links 7 and 8, to said means 2 and 4 and which are formed so as to determine automatically, with the aid of the information received from said means 2 and of the duration of movement received from said means 4, minimum turning radii, left and right. These minimum turns correspond to the minimum right and left turns flown by an aircraft which follows the aforesaid flight trajectory TV (relating to the lead aircraft) for said aforementioned duration of movement;
- means 9 specified hereinbelow, for devising performance information relating to the follower aircraft;
- means 10 which are connected by way of a link 11 to said means 9 and which are formed in such a way as to determine automatically, at least with the aid of the performance information received from said means 9, a maximum turning radius of the follower aircraft; and
- means 12 which are connected, respectively by way of links 13 and 14, to said means 6 and 10 and which are formed in such a way as to deduce automatically, on the basis of the minimum turning radii received from said means 6 and of the maximum turning radius received from said means 10, the maximum possible lateral separation of the follower aircraft with respect to the lead aircraft, on each side of the flight trajectory TV of this lead aircraft.

Thus, the device 1 in accordance with the invention makes it possible to determine automatically for the follower aircraft, on which it is mounted, a maximum lateral separation on each side of the flight trajectory TV of the lead aircraft, in particular the leader of a patrol of aircraft. Consequently, the device 1 in accordance with the invention makes it possible in particular to reduce the workload of the crew of the follower aircraft.

The various possible uses of the maximum lateral separation determined by said set 1A of the device 1 in accordance with the invention will be specified hereinbelow with reference to FIG. 2.

In a particular embodiment, said means 9 comprise:

- a man/machine interface means 15 which allows an operator, in particular the pilot of the follower aircraft, to input the performance information into the device 1. This allows the pilot to retain control of these parameters. Said interface means 15 may be similar (or even correspond) to one of the aforesaid interface means 3 and 5; and/or
- a database 16 directly containing said performance information which corresponds, in this case, preferably, to data provided by the constructor of the follower aircraft.

Additionally, in a particular embodiment, the device 1 in accordance with the invention moreover comprises means 17 which are connected by way of a link 18 to said means 10 and which are formed in such a way as to determine any variations in altitude of the follower aircraft. In this particular embodiment, said means 10 are formed in such a way as to take into account the variations in altitude received from said means 17 so as to determine the maximum turning radius. Thus, said means 10 may take account of the fact that the variations in altitude affect the deceleration and acceleration capabilities of the follower aircraft, and hence its effective performance.

Furthermore, to sharpen the value of the maximum lateral separation determined, said means 12 are formed in such a way as to carry out a smoothing of said maximum lateral separation between two directly successive durations of movement.

Within the framework of the present invention, the maximum lateral separation determined by the aforesaid set 1A of the device 1 in accordance with the invention may be used in various ways, especially as a function of the objectives sought (and as a function of the embodiments of the device 1).

Figure 2:
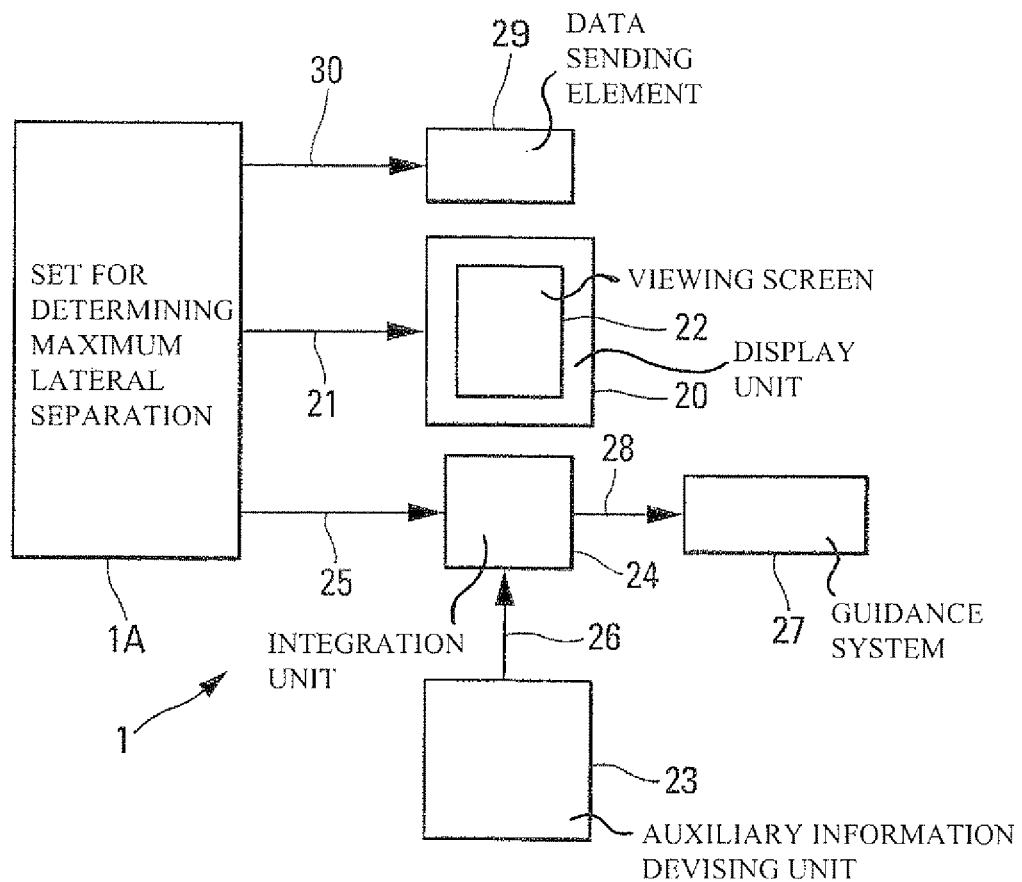
FIG. 2 diagrammatically illustrates refinements of a device in accordance with the invention.

In a particular embodiment represented in FIG. 2, said device 1 moreover comprises display means 20 which are connected by way of a link 21 to said set 1A and which are formed in such a way as to present, on at least one viewing screen 22 which is mounted preferably in the flight deck of the follower aircraft, an indicator of value which illustrates the maximum lateral deviation determined by said means 12. Such a display makes it possible in particular to inform the pilot of the follower aircraft of the value of said maximum lateral separation. The pilot consequently knows the maximum limit not to be exceeded when he determines a lateral separation, for example before inputting it manually into a standard system for aiding patrol flight.

Additionally, in a preferred embodiment, the device 1 in accordance with the invention moreover comprises:

standard means 23 for devising auxiliary information which relates to a patrol formed by the lead aircraft (or leader) mentioned above and the follower aircraft on which the device 1 in accordance with the invention is mounted, as well as by at least one additional follower aircraft. This auxiliary information comprises at least the configuration (places, spacings, etc.) of the patrol; and means 24 which are connected, respectively by way of links 25 and 26, to said means 12 and 23 and which are formed in such a way as to determine, at least with the aid of the maximum lateral separation received from said means 12 and of said auxiliary information devised by said means 23, a recommended relative position of said follower aircraft with respect to said lead aircraft, taking account of the configuration of the patrol.

To determine said recommended relative position, said means 24 adhere in particular:

to criteria of minimum longitudinal gap between the various aircraft. These criteria are fixed in a standard fashion for safety reasons; and to criteria of lateral gap, dependent in particular on the configuration of the patrol.

Furthermore, said means 24 are also formed in such a way as to carry out permanent tailoring of this recommended relative position (or ideal position) by integrating the duration of movement input by the pilot with the aid of said means 4.

In the aforesaid embodiment, the device 1 in accordance with the invention can moreover comprise a standard guidance system 27 which is in particular connected by way of a link 28 to said means 24 and which is intended to guide, especially automatically, the follower aircraft. Within the framework of the present invention, this guidance system 27 is formed in such a way as to guide the follower aircraft so that it is brought to the recommended relative position determined by said means 24 and that it is maintained at this recommended relative position during the patrol flight.

Said guidance system 27 and said means 23 may form part of a standard electronic system for aiding patrol flights.

Figure 3:
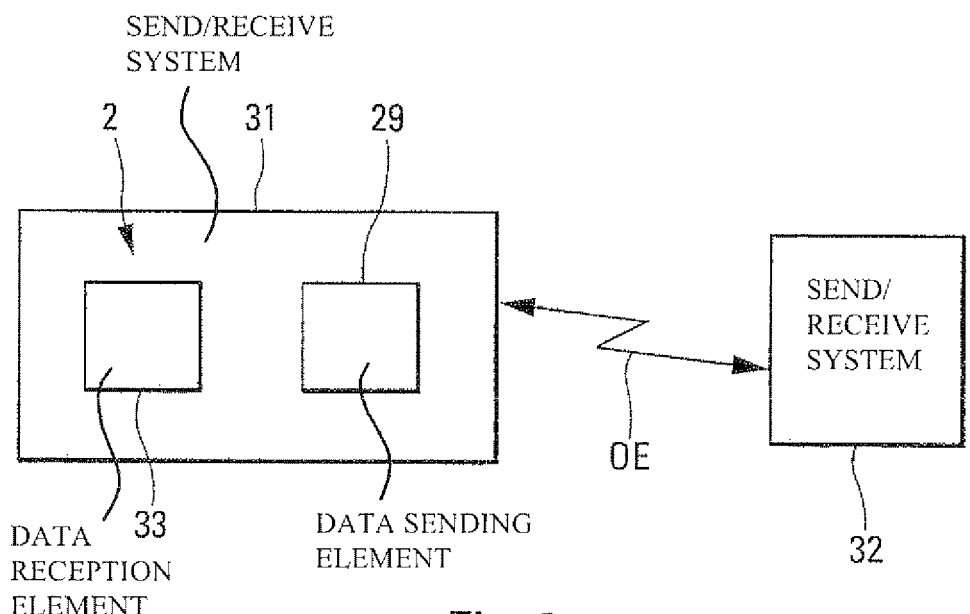
FIG. 3 diagrammatically shows a particular embodiment of means forming part of a device in accordance with the invention.

Additionally, as a variant or as a supplement, the device 1 in accordance with the invention moreover comprises a data sending element 29 which is connected by way of a link 30 to said means 12. In a particular variant embodiment represented in FIG. 3, this data sending means 29 forms part of a send/receive system 31 which carries out a transmission of data in both directions, in particular in the form of electromagnetic waves OE, in cooperation with a send/receive system 32 (for example similar) which is mounted on the lead aircraft. Thus, said data sending element 29 can transmit the maximum lateral separation determined by the means 12 to the lead aircraft. This makes it possible to implement a particular embodiment in which it is the lead aircraft which modifies its flight trajectory so as to take account of the lateral separations of the one or more follower aircraft, and not the converse.

Preferably, said send/receive system 31 also comprises a data reception element 33 which may form part of the means 2 and be used to receive the aforesaid information relating to the trajectory of the lead aircraft, directly from the latter.

The invention claimed is:

1. A device for determining at least one maximum lateral separation of a follower craft with respect to a lead craft, which device is mounted on said follower craft and comprises:
    a first unit configured to devise information relating to the trajectory of said lead craft;
    a second unit configured to allow an operator to input a duration of movement;
    a third unit configured to determine automatically, with the aid of said information relating to said trajectory and of said duration of movement, minimum turning radii, left and right, for a craft which follows said trajectory for said duration of movement;
    a fourth unit configured to devise performance information relating to said follower craft;
    a fifth unit configured to determine automatically, at least with the aid of said performance information, a maximum turning radius of the follower craft; and
    a sixth unit configured to deduce automatically, from said minimum turning radii and from said maximum turning radius, the maximum possible lateral separation of the follower craft with respect to the lead craft, on each side of the trajectory of the latter.

2. The device as claimed in claim 1, wherein said first unit comprises a man/machine interface device configured to allow an operator to input into said device said information relating to the trajectory of the lead craft.

3. The device as claimed in claim 1, wherein said first unit comprises a data reception element which is configured to receive said information relating to the trajectory of the lead craft.

4. The device as claimed in claim 1, wherein said fourth unit comprises a man/machine interface means configured to allow an operator to input said performance information into said device.

5. The device as claimed in claim 1, wherein said fourth unit comprises a database including said performance information.

6. The device as claimed in claim 1, which moreover comprises a seventh unit configured to determine variations in altitude of the follower craft, and wherein said fifth unit is configured to take into account these variations in altitude to determine said maximum turning radius.

7. The device as claimed in claim 1, wherein said sixth unit is configured to carry out a smoothing of said maximum lateral separation at the level of the switch between two directly successive durations of movement.

8. The device as claimed in claim 1, which moreover comprises a display unit configured to present, on at least one viewing screen, an indicator of value illustrating said maximum lateral separation deduced by said sixth unit.

9. The device as claimed in claim 1, which comprises a data sending element which is configured to send said maximum lateral separation deduced by said sixth unit.

10. The device as claimed in claim 1, which comprises:
- an eighth unit configured to devise auxiliary information relating to a patrol formed of said lead craft, of said follower craft and of at least one additional follower craft; and
- a ninth unit configured to determine, with the aid of said maximum lateral separation deduced by said sixth unit and of said auxiliary information devised by said eighth unit, a recommended relative position of said follower craft with respect to said lead craft.

11. The device as claimed in claim 10, wherein said ninth unit is configured to carry out a tailoring of said recommended relative position by integrating said duration of movement.

12. The device as claimed in claim 10, which comprises a guidance system to guide the follower craft, and wherein this guidance system is configured to guide said follower craft so that it is brought to and maintained at said recommended relative position.

13. An aircraft, which comprises a device as specified under claim 1.

* * * * *